March 21, 1944.   J. HUTTON   2,344,818
VALVE
Filed May 25, 1942   6 Sheets-Sheet 1
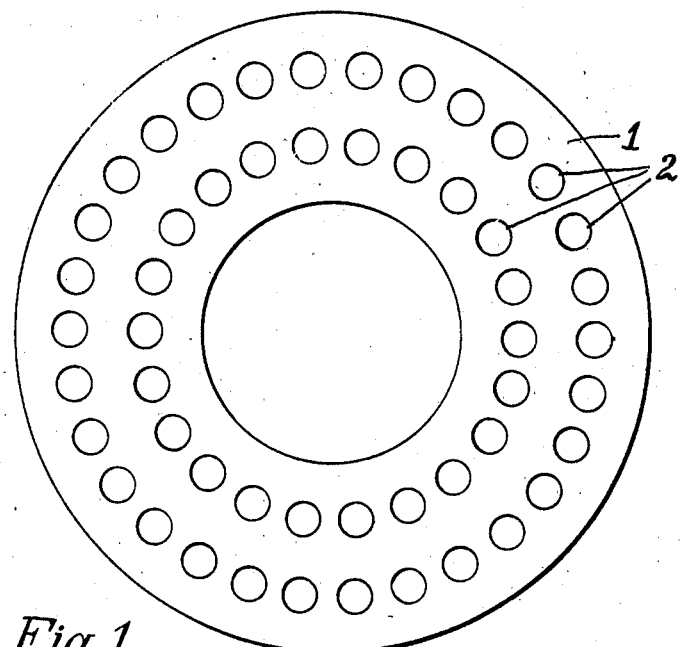
Fig. 1.
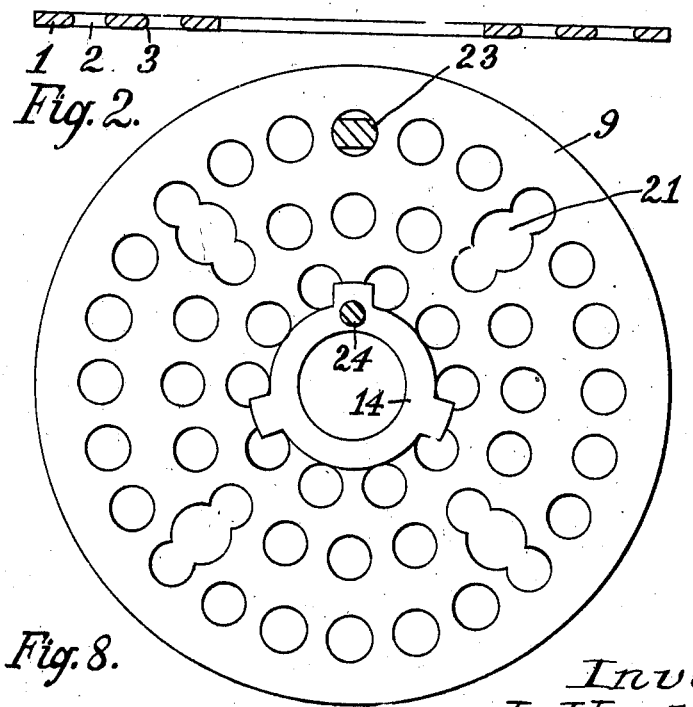
Fig. 2.
Fig. 8.
Inventor
J. Hutton
By Glascock Downing & Seibold
Attys.

March 21, 1944.　　　J. HUTTON　　　2,344,818
VALVE
Filed May 25, 1942　　　6 Sheets-Sheet 2

Inventor
J. Hutton
By Glascock Downing & Seebold
Attys

March 21, 1944.     J. HUTTON     2,344,818

VALVE

Filed May 25, 1942     6 Sheets-Sheet 5

Inventor
J. Hutton
By Glascock Downey Sechler
Attys

March 21, 1944.　　　　　J. HUTTON　　　　　2,344,818
VALVE
Filed May 25, 1942　　　　6 Sheets-Sheet 6
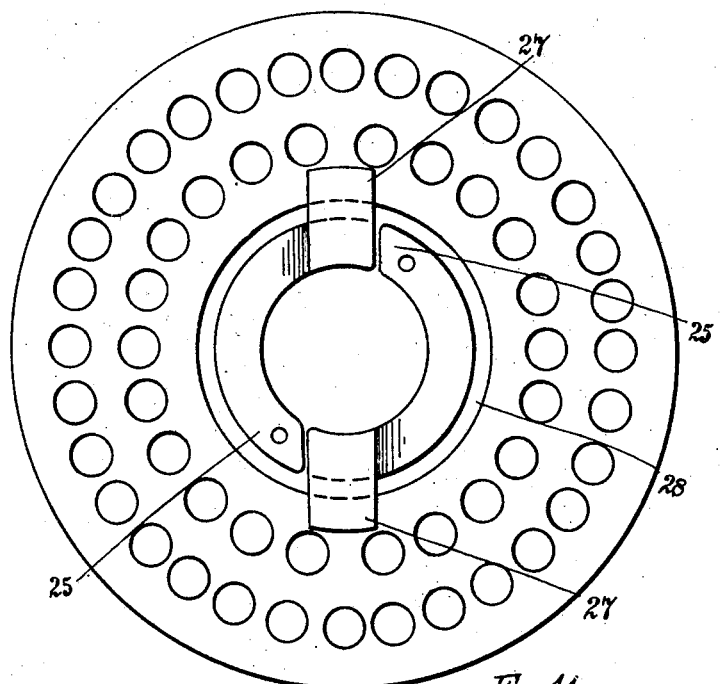
Fig.11
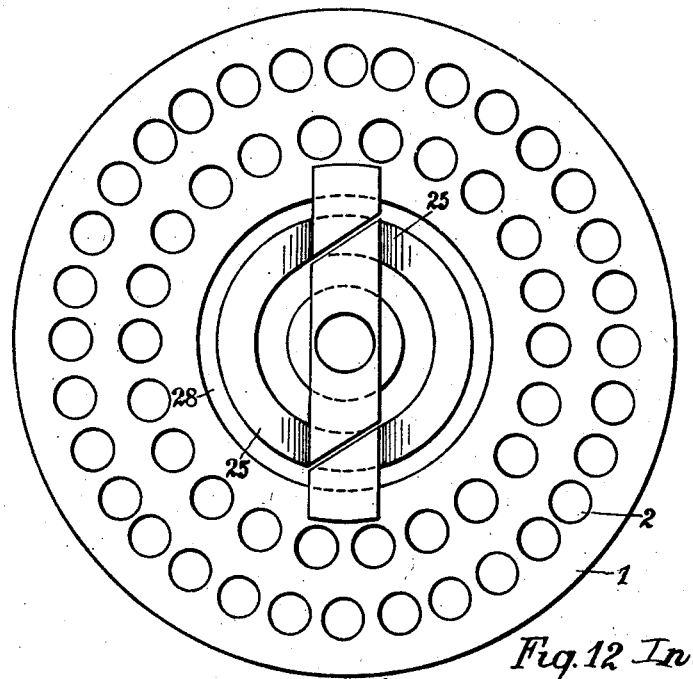
Fig.12　Inventor
J. Hutton
By Glascock Downing & Seebold
Attys.

Patented Mar. 21, 1944

2,344,818

UNITED STATES PATENT OFFICE 2,344,818

VALVE

James Hutton, Letchworth, England, assignor to J Browett Lindley (1931) Limited, Letchworth, England Application May 25, 1942, Serial No. 444,411
In Great Britain July 12, 1941

2 Claims. (Cl. 251—119)

This invention relates to valves of the kind comprising a plate or disc and a valve seat both having a series of openings therein through which the fluid passes and which are employed in association with similarly perforated cushion and guard plates.

Such valves are known as slot disc or Hoerbiger type valves.

The invention has for its object to provide an improved construction of valves of the kind referred to and according to one feature of the invention the valve plate of a slot disc type valve is provided with openings therein in the form of holes instead of the usual annular slots, which holes may be formed by a simple drilling operation and preferably have their edges rounded-off to reduce friction.

According to a further feature of the invention, the valve seat is formed with orifices of Venturi or nozzle formation whereby a minimum seat resistance is afforded.

Further features of the invention will be hereinafter described and claimed in the appended claims.

In the accompanying drawings—

Figure 1 is a plan view of a valve plate according to the invention.

Figure 2 is a vertical section of Figure 1.

Figure 8 is a plan view of the cushion plate according to Figures 5 to 7 and showing the positions of the locating or guide pegs and the lift washer, and Figures 9 to 12 are plan views of valve plates according to the invention having various forms of flexible anchorages.

Figure 3:
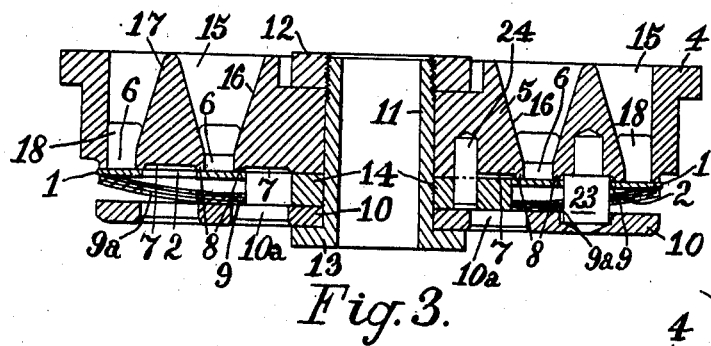
Figure 3 is a vertical section of a complete valve assembly according to the invention.

In carrying the invention into effect in one convenient manner as illustrated in the drawings and referring particularly to Figures 1 and 2, a valve plate is provided in the form of a ring or annulus 1 having one or more rings of circular holes 2 therein spaced apart from one another and conveniently formed simply by drilling, the edges 3 of the holes being preferably rounded-off so that the resistance to flow through the holes in the valve plate will have a low frictional value.

The resultant valve plate is exceptionally strong, compared with the elongated slot type plate, and is produced by a simple manufacturing process.

The valve plate has only a slight lift and the areas of the valve seat and valve plate openings will depend upon the permissible lift of a particular valve, which is fixed by the number of lifts per unit of time.

The valve seat 4 as illustrated in Figures 3 to 7, wherein the valve plate is given the same references as are applied to Figure 1, is in the form of a disc 5 having a series of orifices 6 therein and having recessed portions 7 on its seating face between the orifices to form seats 8 for the imperforate portions of the valve plate between the rings of holes therein and since the area of these holes is only a relatively small percentage of the imperforated area it is possible for the valve seat orifices to be made of Venturi or nozzle formation, as shown, the narrowest ends thereof terminating at the seating surface. The Venturi or nozzle form of the valve seat orifices provides for a minimum seat resistance.

The smallest valve seat orifice will be slightly greater than twice the lift of the valve plate and between one orifice and the next there will be two small diameter valve seats spaced an extent corresponding to the diameter of the holes in the valve plate.

Figure 4:
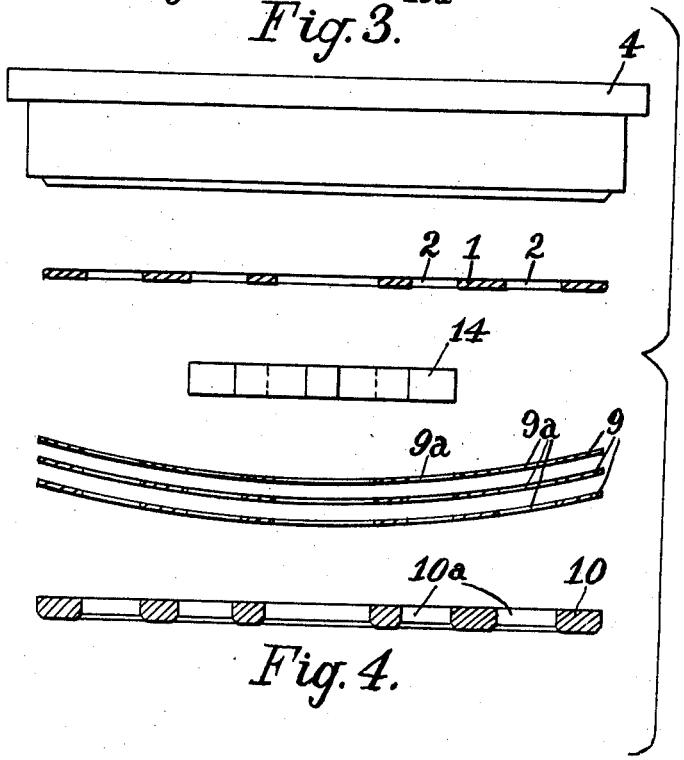
Figure 4 is an exploded view of Figure 3.

Referring to Figures 3 and 4, wherein a complete valve assembly is shown, the cushion plate 9 which is provided in this type of valve to reduce the shock of opening the valve plate and absorb the inertia effect thereof and which, together with the guard plate 10 may have the openings therein in the form of simple holes 9a, 10a corresponding to the holes 2 in the valve plate, is bent up at diametrically opposite portions thereof to provide the desired resiliency, whereby the cushion plate, which may be employed with or without the usual helical springs provided to hold the valve plate seated, is capable of controlling the opening and closing movements of the valve plate to the desired extent. The valve seat 4 and the guard plate 10 are secured together by a central securing sleeve 11 screw-threaded at one end to receive the retaining nut 12 and having a peripheral flange 13 at its opposite end between which and the valve seat the guard plate 10 and a spacing or lift washer 14 are retained, the lift washer serving as a guide for the valve plate. The flexible cushion plate is shown as being composed of three similar discs superimposed upon each other. The valve seat is formed with radial ribs 15 and the side walls 16 of the ring portions 17 of the seat between which the orifices 6 are inclined as shown to give a Venturi or nozzle effect which is continued into the innermost portion or entrance throat 18 of each orifice so that the area at such portions of the orifices is greater than that of the outlet portions 6 of the orifices and there is thus no impedance to the air flow.

Figure 5:
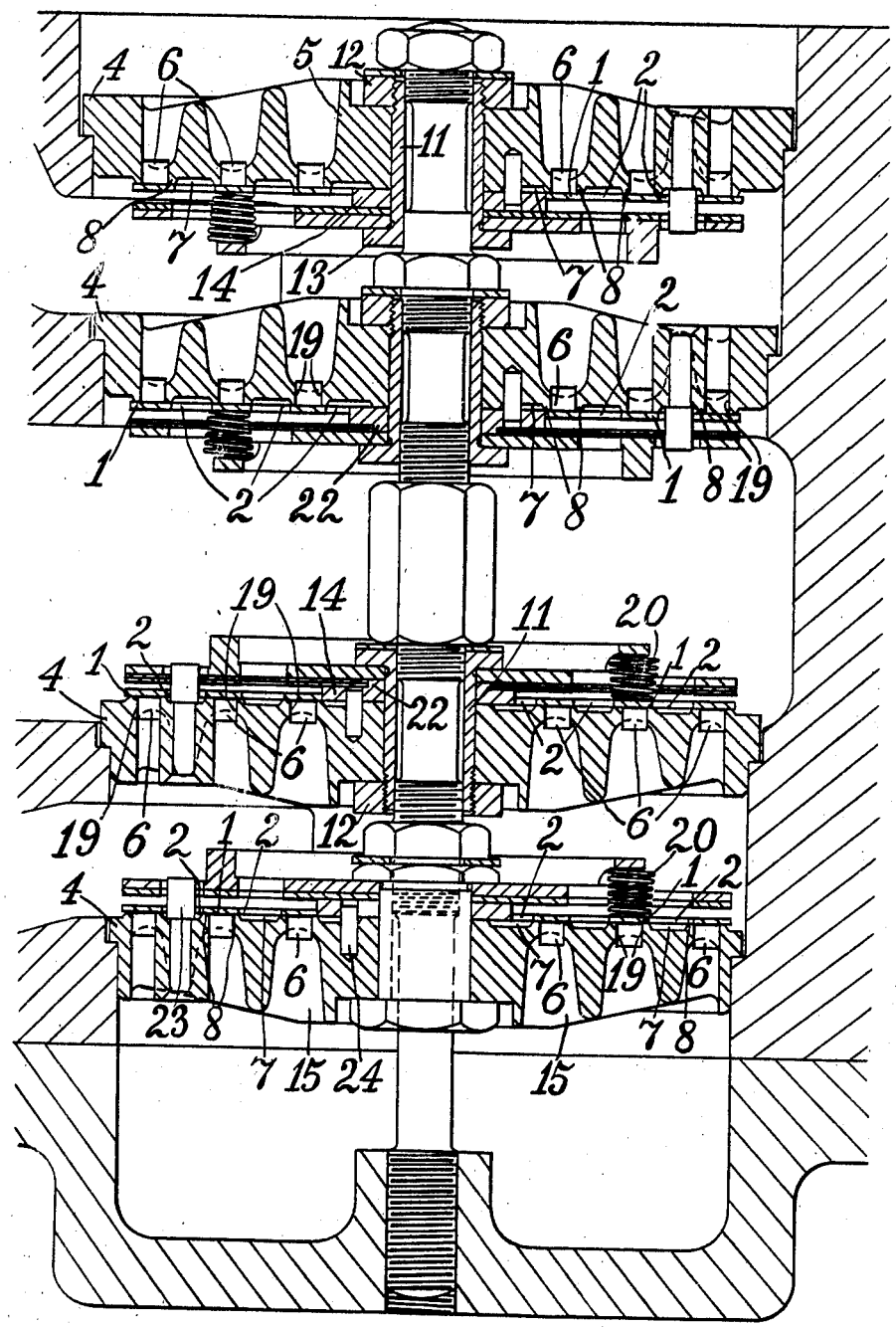
Figure 5 is a vertical section through an assembly of valves according to the invention and showing two suction valves and two delivery valves.

In Figure 5 a modified form of valve seat is shown according to which the parallel side walls 19 of the orifices 6 are continued into the ribs 15 so that the fullest possible area is obtained.

The valve seat can be made as a drop forging and in any embodiment of the invention the valve plate, guard plate and cushion plate can all be provided with simple holes arranged to coincide with each other.

Figure 6:
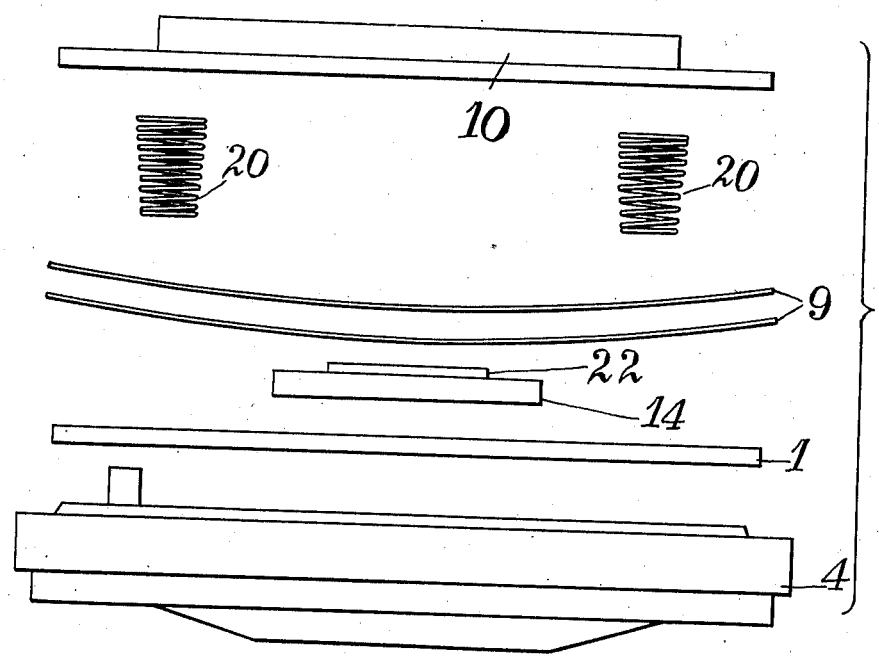
Figures 6 and 7 are exploded views of the delivery and suction valves respectively of Figure 5.
Figure 7:
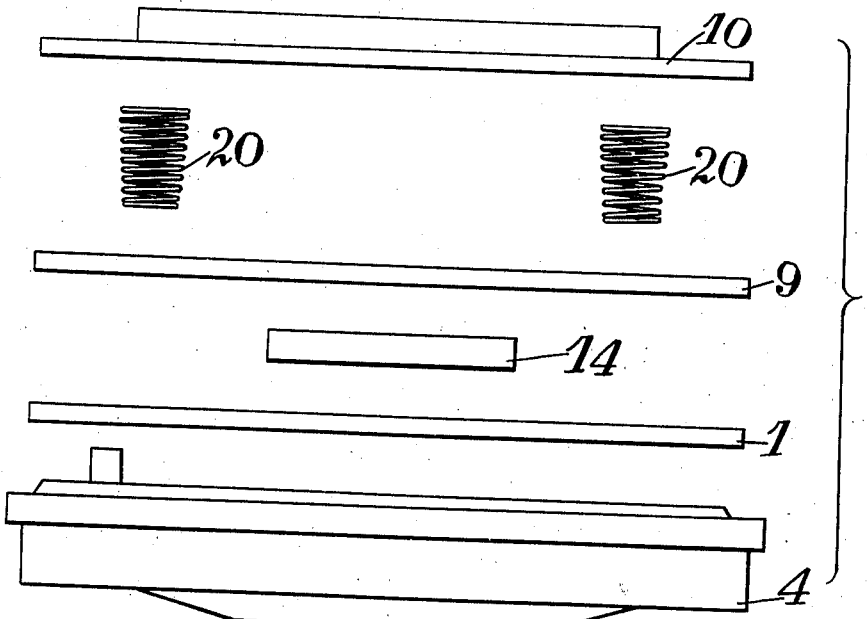

In Figures 5 to 8 the suction valves are shown with their valve plates subjected to the action of the cushioning springs 20, which pass through the enlarged openings 21 (Figure 8) in the cushion plate and which latter is of simple flat form. The delivery valves on the other hand have their cushion plates of laminated construction as shown and with diametrically opposite portions bent up as shown in Figure 6 and operable, as illustrated in Figure 3, to assist the cushioning action of the helical springs 20. These resilient cushion plates of the delivery valves according to Figures 5 and 6 serve to damp the inertia of the valve plates. When secured in position the resilient cushion plates are compressed, by being held at their centres by the lift washers 14, to lie nearly flat but a shallow shoulder 22 on each lift washer provides a small clearance which enables such deflection of the cushion plate as will enable the same to absorb the inertia of the valve plate.

The valve seat is fitted with projecting pegs 23 and 24 for the location of the valve and guard plates and the lift washer respectively.

Figure 9:
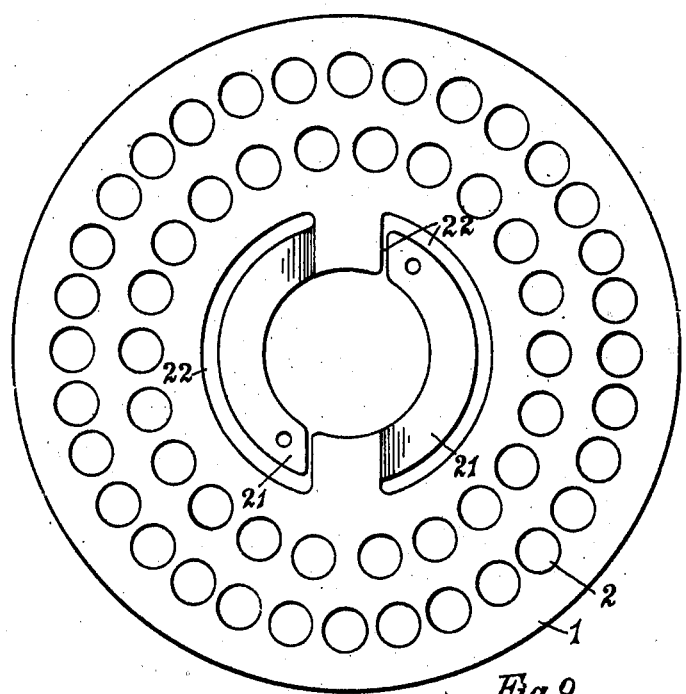
Figure 10:
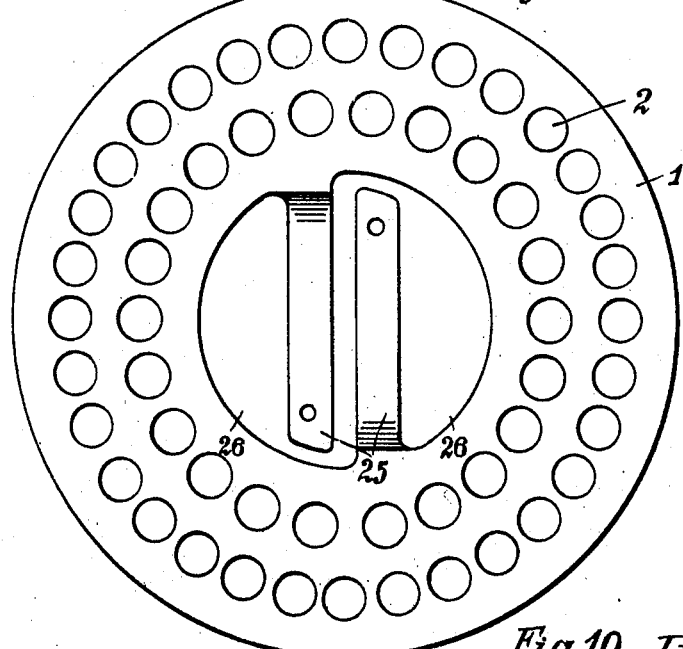

For large valves or with valves inclined to the horizontal the valve plate is conveniently formed, as shown in Figures 9 to 12, with flexible fingers 25 at the centre serving as anchorages by which the valve plates, having also simple holes may be retained in position in the valve assembly. In Figures 9 and 10 the flexible fingers are formed by slotting the valve plate at the parts indicated at 26 while in Figures 11 and 12 the flexible fingers are held to the valve plate proper by radial webs 27 formed by machining away the back of the valve plate to expose the annular slots 28 formed by turning the front face of the valve plate.

I claim:

1. A ring plate valve for use on air compressors comprising in combination a valve seat, a valve plate movably mounted with respect to the valve seat, a guard plate spaced from said valve seat, a flexible cushion plate situated between the valve plate and the guard plate and serving to damp the opening movements of the valve plate, all said members being in the form of discs arranged in superposed relationship, the valve seat and the valve guard plate being fixed in position and having a series of ports therein through which the air may pass and the valve plate having a series of circular holes therein through which the air may pass when the valve plate is moved out of contact with the valve seat, and a centrally disposed lift washer lying between the valve seat and the guard plate and serving as a guide for the opening movements of the valve plate, said lift washer having a neck portion constructed and arranged for slight movement of the cushion plate to exert the desired cushioning action upon the valve plate.

2. A ring plate valve for use on air compressors comprising in combination a valve seat, a guard plate spaced from said valve seat, a valve plate movably mounted with respect to the valve seat, a flexible cushion plate situated between the valve plate and the guard plate and serving to damp the opening movements of the valve plate, all said members being in the form of discs arranged in superposed relationship, the valve seat and the valve guard plate being fixed in position and having a series of ports therein through which the air may pass and the valve plate having a series of circular holes therein through which the air may pass when the valve plate is moved out of contact with the valve seat, a lift washer centrally disposed to lie between the valve seat and the guard plate and serving as a guide for the valve plate, and means locating the cushion plate on said lift washer such that the cushion plate has only a limited and slight lifting movement relatively to the lift washer, sufficient to provide the desired cushioning effect for the valve plate.

JAMES HUTTON.